US012253160B2

(12) United States Patent
Song et al.

(10) Patent No.: US 12,253,160 B2
(45) Date of Patent: Mar. 18, 2025

(54) METHOD FOR CONTROLLING OPERATION OF SPHERE-TYPE SHIFTING APPARATUS

(71) Applicants: Hyundai Motor Company, Seoul (KR); Kia Corporation, Seoul (KR)

(72) Inventors: Min Gi Song, Seoul (KR); Ki Young Song, Suwon-Si (KR); Hee En Zoo, Goyang-Si (KR); Yong Min Chae, Gyeongsan-Si (KR); Ho Cheol Jang, Daegu (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/663,983

(22) Filed: May 14, 2024

(65) Prior Publication Data
US 2024/0301948 A1 Sep. 12, 2024

Related U.S. Application Data

(62) Division of application No. 17/833,106, filed on Jun. 6, 2022, now Pat. No. 12,055,215.

(30) Foreign Application Priority Data

Aug. 11, 2021 (KR) .................. 10-2021-0106289

(51) Int. Cl.
*F16H 59/08* (2006.01)
*F16H 61/32* (2006.01)

(52) U.S. Cl.
CPC ....... *F16H 59/08* (2013.01); *F16H 2059/081* (2013.01); *F16H 2061/326* (2013.01)

(58) Field of Classification Search
CPC ............... F16H 59/08; F16H 2059/081; F16H 2059/082; F16H 2061/326
See application file for complete search history.

(56) References Cited

U.S. PATENT DOCUMENTS

| | | | |
|---|---|---|---|
| 6,848,332 | B2 | 2/2005 | Hayashi |
| 7,106,303 | B2 | 9/2006 | Bricaud |
| 9,128,509 | B2 | 9/2015 | Min |
| 9,212,740 | B2 | 12/2015 | Watanabe |
| 9,436,208 | B2 | 9/2016 | Kim |

(Continued)

FOREIGN PATENT DOCUMENTS

| | | |
|---|---|---|
| CN | 113586702 | 11/2021 |
| DE | 102017202437 A1 | 8/2018 |

(Continued)

*Primary Examiner* — Bobby Rushing, Jr.
(74) *Attorney, Agent, or Firm* — Morgan, Lewis & Bockius LLP

(57) ABSTRACT

In a method for controlling an operation of a sphere type shifting apparatus, and according to an exemplary embodiment of the present disclosure, it is possible to prevent a sphere mechanism from being separated from a rotation completion location upon rotation operation of the sphere mechanism including a shifting unit provided on a hemispherical one side thereof and a design unit provided on a hemispherical other side thereof, preventing occurrence of clearance of the sphere mechanism, and to terminate an operation of a motor as necessary when the sphere mechanism cannot reach the rotation completion location due to sticking thereof or foreign substances stuck thereto upon rotation operation of the sphere mechanism, preventing damage to parts.

10 Claims, 10 Drawing Sheets

(56) References Cited

U.S. PATENT DOCUMENTS

| | | |
|---|---|---|
| 10,133,357 B2 | 11/2018 | Park |
| 10,914,372 B2 | 2/2021 | Yamamoto |
| 2019/0368599 A1 | 12/2019 | Guevara |
| 2020/0326746 A1 | 10/2020 | Koike |
| 2021/0301921 A1 | 9/2021 | Kimura |

FOREIGN PATENT DOCUMENTS

| | | |
|---|---|---|
| KR | 1020190050374 | 5/2019 |
| KR | 1020210138956 | 11/2021 |
| KR | 1020220065468 | 5/2022 |
| WO | WO 2019207899 A1 | 10/2019 |

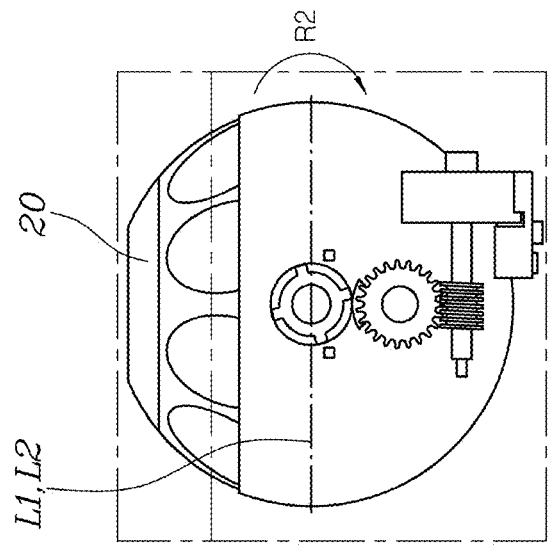
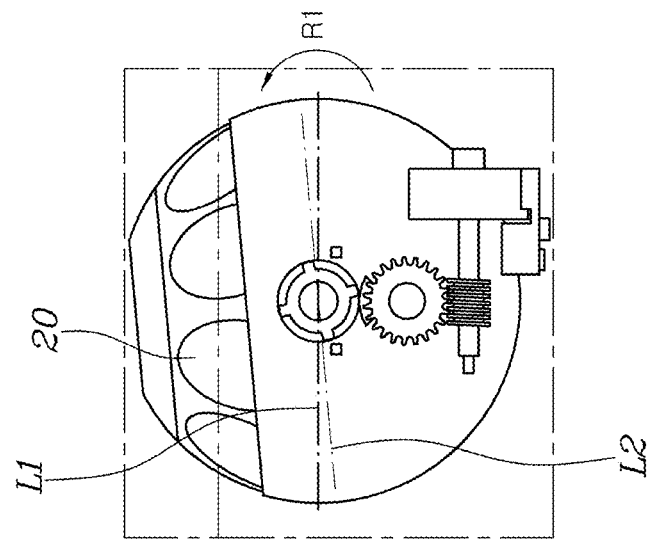
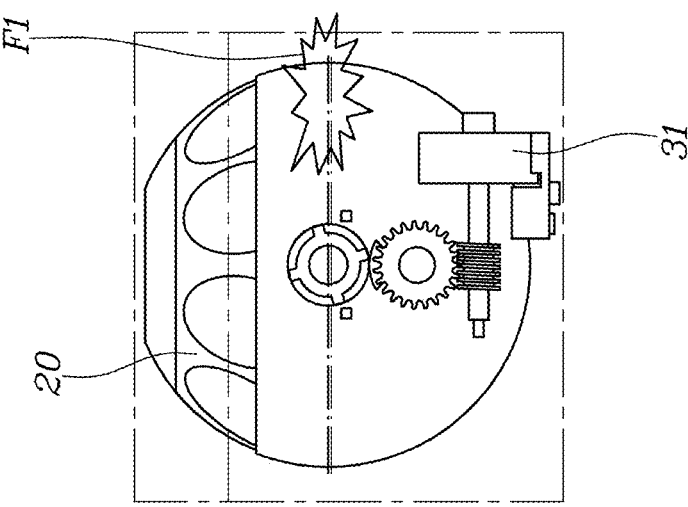

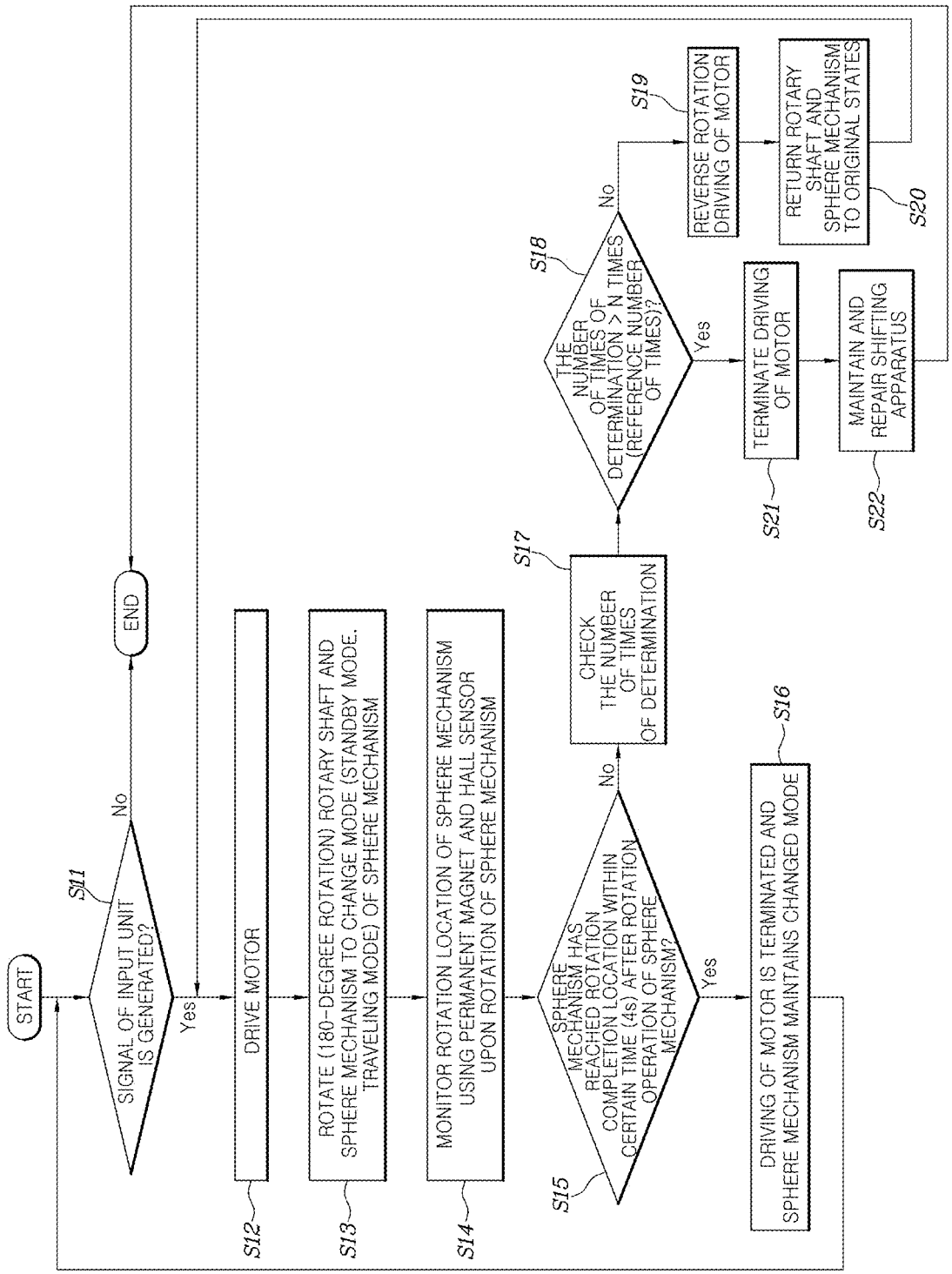

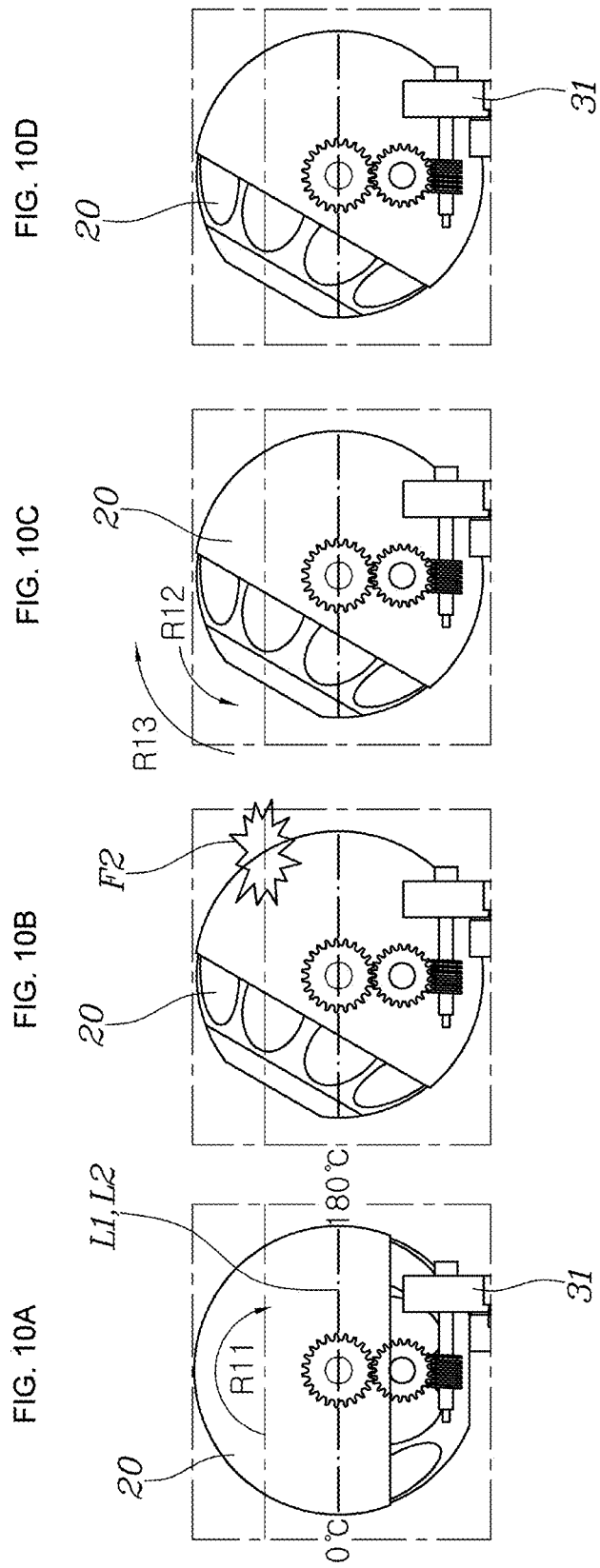

METHOD FOR CONTROLLING OPERATION OF SPHERE-TYPE SHIFTING APPARATUS

CROSS REFERENCE TO RELATED APPLICATION

The present application is a divisional of U.S. patent application Ser. No. 17/833,106, filed Jun. 6, 2022, which claims priority to Korean Patent Application No. 10-2021-0106289, filed on Aug. 11, 2021, the entire contents of which is incorporated herein for all purposes by this reference.

BACKGROUND OF THE PRESENT DISCLOSURE

Field of the Present Disclosure

The present disclosure relates to a method for controlling an operation of a sphere type shifting apparatus, and more specifically, to a technology on a method for controlling an operation of a sphere type shifting apparatus, which can prevent clearance and strengthen stability upon rotation operation of a sphere mechanism provided with a shifting unit and a design unit.

Description of Related Art

In general, a vehicle mounted with an automatic transmission controls a hydraulic pressure within a shifting range set depending upon a traveling speed of the vehicle so that a shift gear of a target shifting stage range may be automatically operated.

The automatic transmission utilizes a hydraulic circuit, a planetary gear, and friction elements to perform a shifting to generate a gear ratio, and a transmission control unit (TCU) is in charge of controlling these components.

A shift by wire (SBW) system, which is an electronic shift system for a vehicle, is an electronic shift system that does not have a mechanical connection structure such as a cable between the transmission and the shifting apparatus (lever, button, or dial) unlike the conventional mechanical shift system, and is a system that when a signal generated upon operation of the electronic shifting apparatus is transmitted to the transmission control unit (TCU), a transmission actuator is operated by an electronic signal instructed by the TCU, and the hydraulic pressure is applied or blocked to the hydraulic circuit for each shifting stage by operation of the transmission actuator, and therefore the shift control is electronically performed.

Therefore, the automatic transmission based on the SBW has an advantage in that delivers a driver's will to shift to the TCU with an electric signal through a simple operation of the electronic shifting apparatus, and therefore, the shifting to a D-stage, an R-stage, an N-stage, etc. is performed more easily, and has an advantage in that it is possible to miniaturize the shifting apparatus, securing a large space between a driver seat and a passenger seat.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method for controlling an operation of a sphere type shifting apparatus, which can prevent a sphere mechanism from being separated from a rotation completion location upon rotation operation of the sphere mechanism in a sphere type shifting apparatus for an electronic shift system in which locations of a shifting unit and a design unit are changed through 180 degrees rotation of the sphere mechanism including the shifting unit provided on a hemispherical one side thereof and the design unit for indirect light and image transmission provided on a hemispherical other side, preventing occurrence of clearance of the sphere mechanism, preventing unnecessary noise due to the sphere mechanism, and improving luxuriousness.

Furthermore, another object of the method for controlling the operation of the sphere type shifting apparatus according to an exemplary embodiment of the present disclosure is to induce a normal operation, prevent damage to parts, and strengthen stability through a fail-safe function when there occurs a situation that a sphere mechanism cannot be rotated due to sticking thereof or foreign substances stuck thereto upon rotation operation of the sphere mechanism.

A method for controlling an operation of a sphere type shifting apparatus according to an exemplary embodiment of the present disclosure for achieving the objects includes rotating a sphere mechanism to change a mode of the sphere mechanism by a power generated by driving of a motor when a signal of an input unit configured to generate a rotation operation signal of the sphere mechanism is generated; determining whether the sphere mechanism has been located at a rotation completion location by monitoring rotation of the sphere mechanism; and additionally driving the motor whose driving is terminated when it is determined that the sphere mechanism is not located at the rotation completion location so that the sphere mechanism is located at the rotation completion location.

The driving of the motor is controlled by a printed circuit board (PCB) when the signal of the input unit is generated, and the signal of the input unit is any one of start-ON and -OFF signals of a vehicle, or an open signal and a close signal of a door, or an unlock signal or a lock signal of the door, or a traveling mode change signal (autonomous traveling mode or manual driving mode change signal), or an ON signal and an OFF signal of a switch.

The mode of the sphere mechanism includes a traveling mode so that a shifting unit is exposed to a vehicle interior through an opening portion of a housing of the spherical shifting apparatus, and a standby mode so that a design unit is exposed to the vehicle interior through the opening portion of the housing, and the traveling mode and the standby mode are alternately changed whenever the sphere mechanism is rotated in 180 degrees.

In the determining of the location, the rotation completion location of the sphere mechanism is a location when the sphere mechanism is in a state of being rotated by 180 degrees, and the rotation completion location is detected by use of a permanent magnet and a hall sensor rotated with the sphere mechanism.

As a result of the determining of the location, if it is determined that the sphere mechanism is located at the rotation completion location, the driving of the motor is terminated, and the sphere mechanism maintains the changed mode until the signal of the input unit is generated again.

In the additionally driving of the motor, the sphere mechanism is located at the rotation completion location by being additionally rotated through a forward direction (clockwise direction) rotation or a reverse direction (counterclockwise direction) rotation of the motor.

In the additionally driving of the motor, an alarm of the additional driving of the motor is generated when the motor is additionally driven and provided to passengers in a vehicle.

Furthermore, a method for controlling an operation of a sphere type shifting apparatus according to another exemplary embodiment of the present disclosure includes rotating a sphere mechanism to change a mode of the sphere mechanism by a power generated by driving of a motor when a signal of an input unit configured to generate a rotation operation signal of the sphere mechanism is generated; determining a location that determines whether the sphere mechanism has reached a rotation completion location within a certain time by monitoring rotation of the sphere mechanism; checking a number of times of determination that checks the number of times of determination in the determining of the location when it is determined that the sphere mechanism does not reach the rotation completion location, and checks whether the number of times of determination has exceeded a reference number of times (N times); and driving the motor in a reverse direction when it is determined that the number of times of determination does not exceed the reference number of times (N times), and returns the sphere mechanism to an original state thereof by a reverse driving of the motor.

The driving of the motor is controlled by a printed circuit board (PCB) when the signal of the input unit is generated, and the signal of the input unit is any one of start-ON and -OFF signals of a vehicle, or an open signal and a close signal of a door, or an unlock signal or a lock signal of the door, or a traveling mode change signal (autonomous traveling mode or manual driving mode change signal), or an ON signal and an OFF signal of a switch.

The mode of the sphere mechanism includes a traveling mode so that a shifting unit is exposed to a vehicle interior through an opening portion of a housing of the spherical shifting apparatus, and a standby mode so that a design unit is exposed to the vehicle interior through the opening portion of the housing, and the traveling mode and the standby mode are alternately changed whenever the sphere mechanism is rotated in 180 degrees.

In the determining of the location, the rotation completion location of the sphere mechanism is a location when the sphere mechanism is in a state of being rotated by 180 degrees, and the rotation completion location is detected by use of a permanent magnet and a hall sensor rotated with the sphere mechanism.

As a result of the determining of the location, if it is determined that the sphere mechanism reaches the rotation completion location, the driving of the motor is terminated, and the sphere mechanism maintains the changed mode until the signal of the input unit is generated again.

In the returning, the reverse driving of the motor is a direction opposite to a driving direction of the motor in the rotating.

In the returning, the returning of the sphere mechanism to the original state is a state of the sphere mechanism before the signal of the input unit in the rotating is generated.

When it is determined that the number of times of determination exceeds the reference number of times (N times), the driving of the motor is terminated and a control logic is terminated.

In the returning, when the sphere mechanism returns to an original state by the reverse driving of the motor or the driving of the motor is terminated as the number of times of determination exceeds the reference number of times (N times), each alarm is generated and provided to passengers in a vehicle.

The method for controlling operation of the sphere type shifting apparatus according to an exemplary embodiment of the present disclosure has an effect of preventing occurrence of clearance of the sphere mechanism, preventing unnecessary noise due to the sphere mechanism, and improving luxuriousness by removing a phenomenon in which the sphere mechanism is separated from the rotation completion location upon rotation operation of the sphere mechanism including the shifting unit provided on the hemispherical one side thereof and the design unit provided on the hemispherical other side thereof.

Furthermore, the method for controlling operation of the sphere type shifting apparatus according to an exemplary embodiment of the present disclosure has an effect that it is possible to induce the normal operation so that the sphere mechanism reaches the rotation completion location through the fail-safe function when the sphere mechanism does reach the rotation completion location due to sticking thereof or foreign substances stuck thereto upon rotation operation of the sphere mechanism, and in particular, to terminate the operation of the motor if the normal operation in which the sphere mechanism reaches the rotation completion location is not available, preventing damage to parts and strengthening stability.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 8A, FIG. 8B, and FIG. 8C are diagrams for helping understanding of a situation according to the various exemplary embodiments of the present disclosure.

FIG. 9 is a flowchart for explaining a method for controlling an operation of a sphere type shifting apparatus according to various exemplary embodiments of the present disclosure.

FIG. 10A, FIG. 10B, FIG. 10C, and FIG. 10D are diagrams for helping understanding of a situation of the various exemplary embodiments of the present disclosure.

Figure 1:
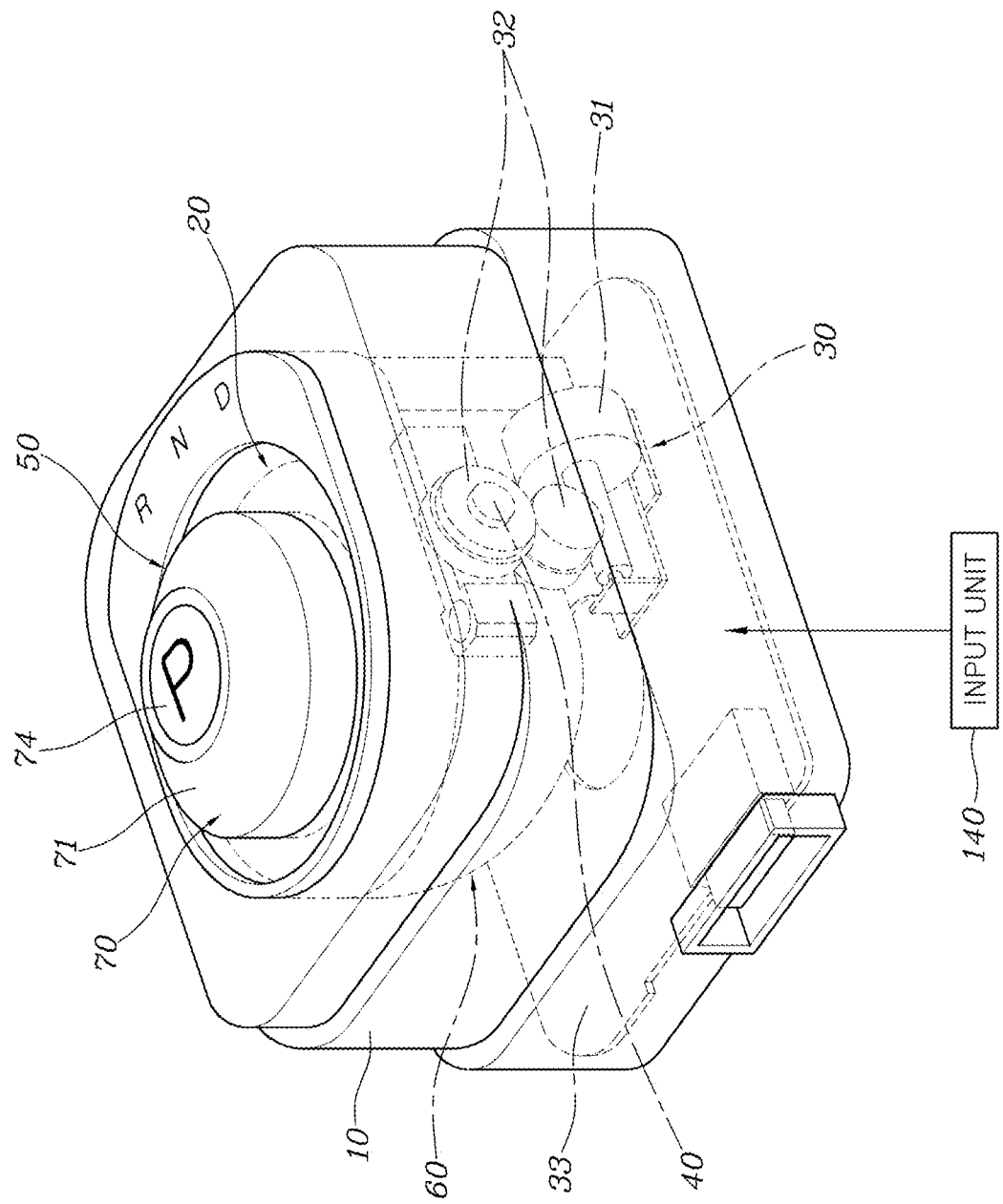
FIG. 1 and FIG. 2 are perspective diagrams of a sphere type shifting apparatus disposed with a shifting dial to which a control logic of the present disclosure is applied.
Figure 2:
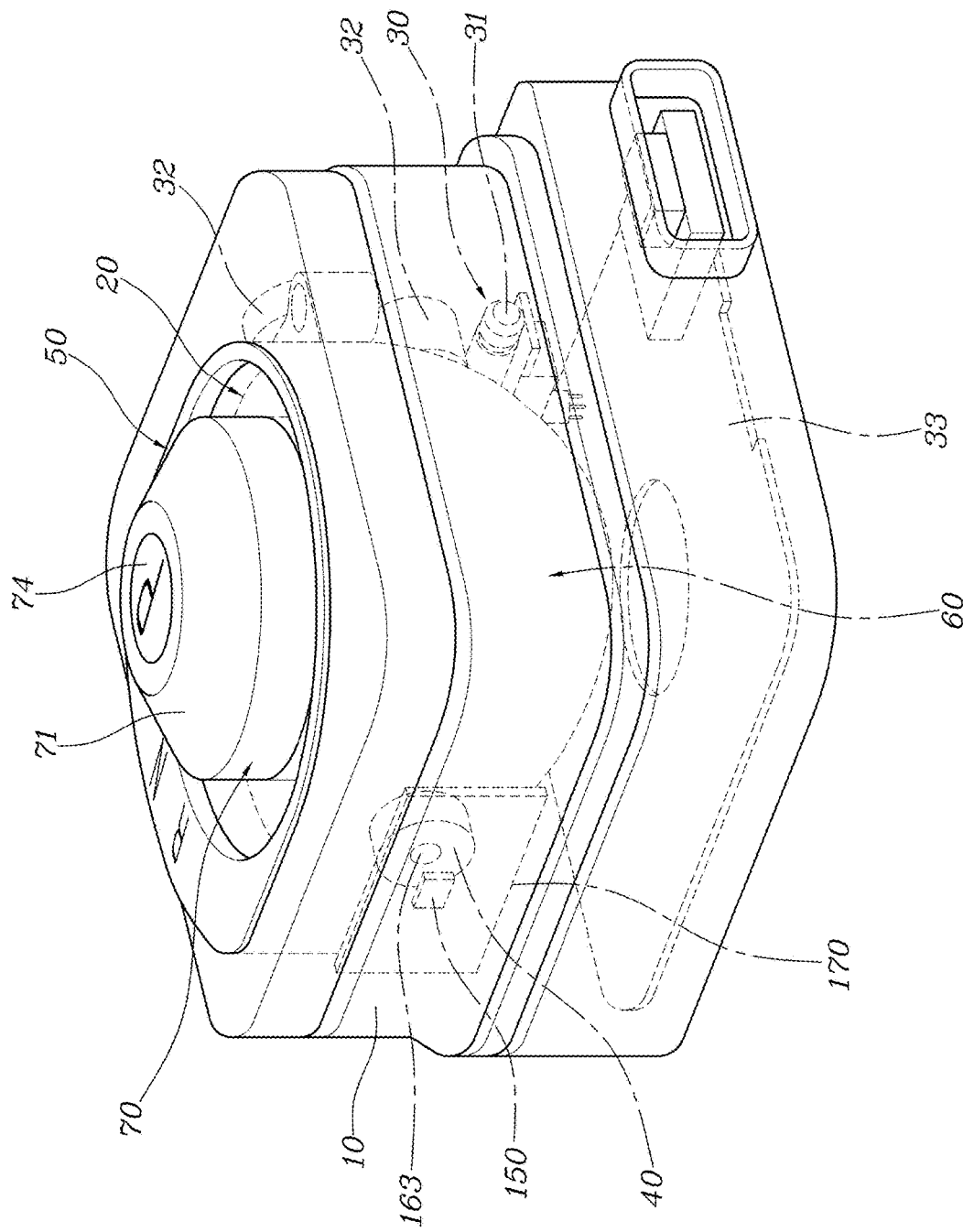
Figure 3:
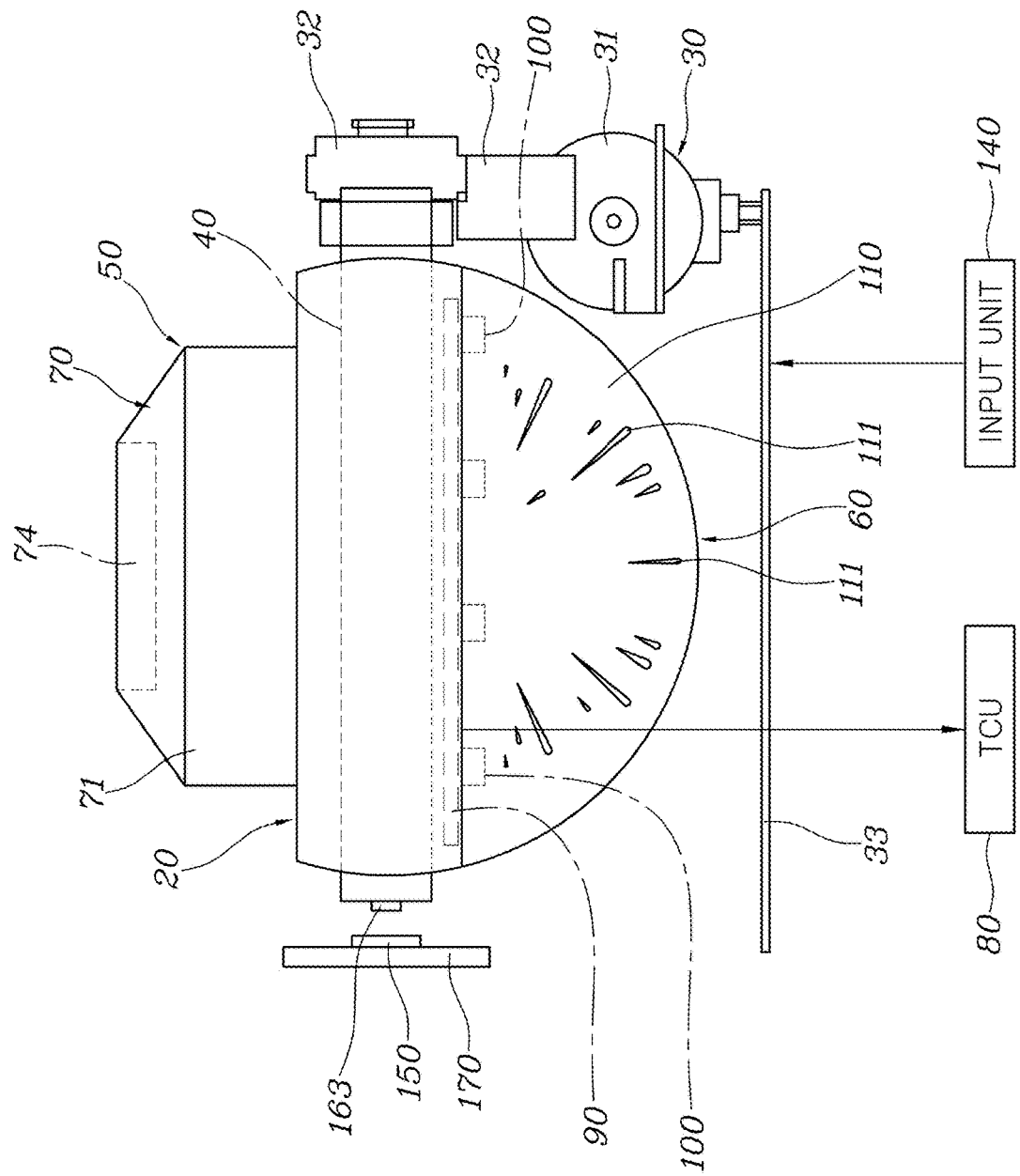
FIG. 3 is a front diagram showing a state where a housing is removed in FIG. 1.
Figure 4:
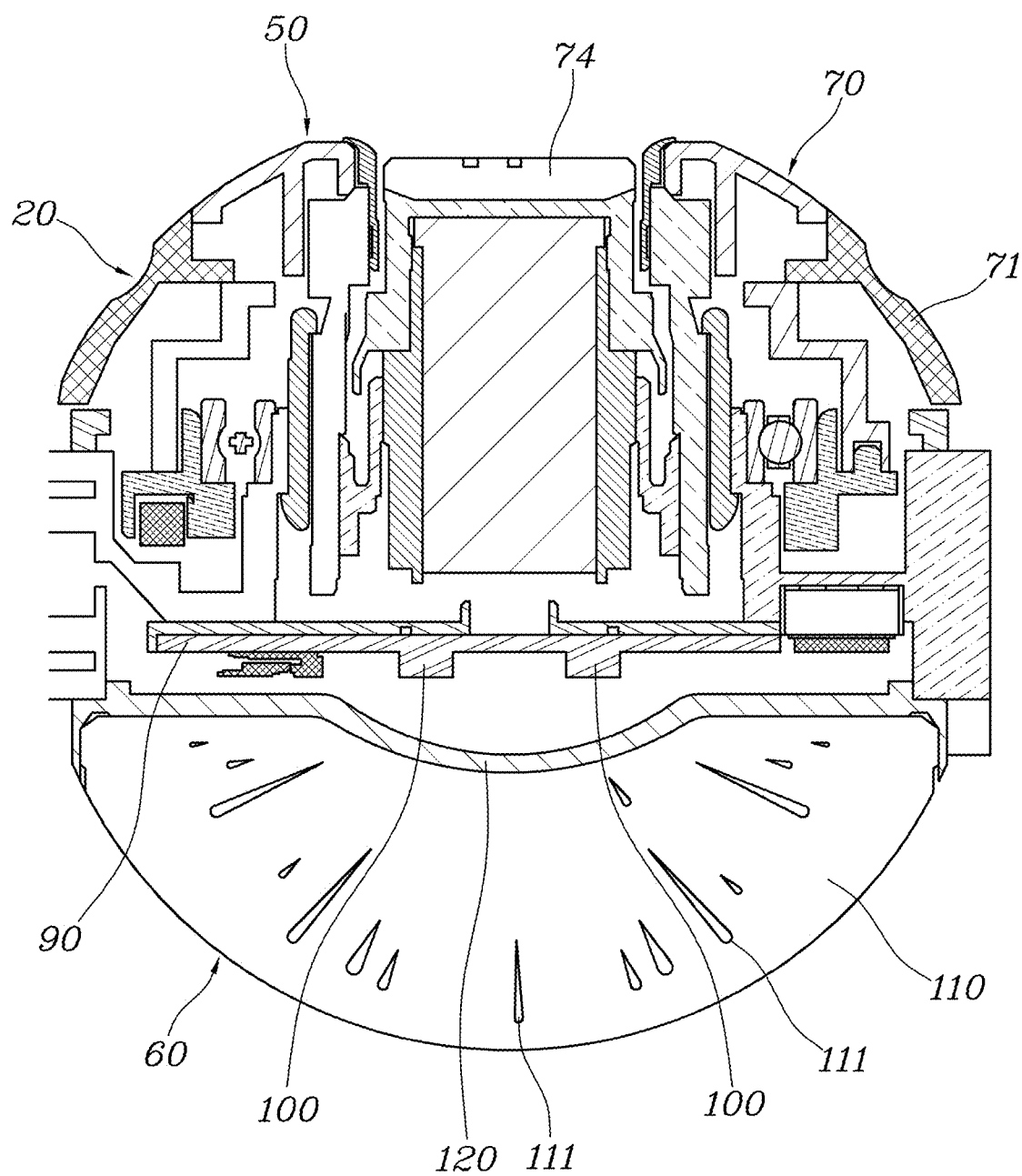
FIG. 4 is a cross-sectional diagram of FIG. 3.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION OF THE PRESENT DISCLOSURE

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structural to functional descriptions of the exemplary embodiments of the present disclosure disclosed in the exemplary embodiment or application are only illustrated for the purpose of describing the exemplary embodiments according to an exemplary embodiment of the present disclosure, and the exemplary embodiments according to an exemplary embodiment of the present disclosure may be embodied in various forms and it should not be construed that the present disclosure is limited to the exemplary embodiments described in the exemplary embodiment or application.

Because the exemplary embodiments according to an exemplary embodiment of the present disclosure may be variously changed and have various forms, specific exemplary embodiments will be illustrated in the drawings and described in detail in the exemplary embodiment or application. However, this is not intended to limit the exemplary embodiments according to the concept of the present disclosure to a particular disclosed form, and it should be understood that the present disclosure includes all changes, equivalents, and substitutes included in the spirit and scope of the present disclosure.

Terms such as first and/or second may be used to describe various components, but the components should not be limited by the terms. The terms are used only for the purpose of distinguishing one component from another, and for example, without departing from the scope according to the concept of the present disclosure, the first component may be named a second component, and similarly, the second component may also be named the first component.

When a component is referred to as being "connected" or "coupled" to another component, the component may be directly connected or coupled to another component, but it should be understood that other components may also be present between the components. On the other hand, when a component is referred to as being "directly connected" or "directly coupled" to another component, it should be understood that there are no other components between the components. Other expressions which describe the relationship between the components, that is, "between" and "immediately between" or "neighboring" and "directly neighboring to" should be interpreted in the same manner.

The terminology used in the present specification is merely for the purpose of describing particular exemplary embodiments of the present disclosure, and is not intended to limit the present disclosure. The singular forms may include plural forms unless the contexts clearly indicate the opposite. In the present specification, it may be understood that the term "comprising", "having", or the like specifies the presence of the characteristic, integer, step, operation, component, part, or a combination thereof described, and does not exclude the presence or addition possibility of one or more other characteristics, integers, steps, operations, components, parts, or combinations thereof in advance.

Unless defined otherwise, all terms including technical terms or scientific terms used herein have the same meaning as commonly understood by those skilled in the art to which the present disclosure pertains. The terms defined in the dictionary commonly used may be interpreted as including a meaning consistent with the meaning in the context of the related technology, and may not be interpreted as an ideal or excessively formal meaning, unless clearly defined in the exemplary embodiment of the present disclosure.

A control unit (controller) according to the exemplary embodiment of the present disclosure may be implemented through a non-volatile memory configured to store data relating to an algorithm configured to control the operation of various components of a vehicle or software instructions for reproducing the algorithm and a processor configured to perform operations described below using data stored in the corresponding memory. Here, the memory and the processor may be implemented as separate chips. Alternatively, the memory and the processor may be implemented as a single chip integrated with each other. The processor can take the form of one or more processors.

Hereinafter, a sphere type shifting apparatus for an electronic shift system according to exemplary embodiments of the present disclosure will be described with reference to the accompanying drawings.

A sphere type shifting apparatus of an electronic shift system according to an exemplary embodiment of the present disclosure includes a housing 10, a sphere mechanism 20 rotatably coupled to the housing 10, and a power mechanism 30 configured to provide a rotation power to be rotatable with respect to the housing 10.

The housing 10 is located near a driver seat, and fixed to and provided on a console, a center fascia, etc. That a driver's hand can reach.

A rotation shaft 40 is coupled to penetrate a center portion of the sphere mechanism 20, and the rotation shaft 40 is rotatable with respect to the housing 10.

Therefore, when the rotation shaft 40 is rotated, the sphere mechanism 20 is also rotated with respect to the housing 10 together, and the sphere mechanism 20 maintains a state where the hemispherical one side of the sphere mechanism 20 is exposed to a vehicle interior through the housing 20 and the hemispherical other side thereof is hidden upon rotation.

The hemispherical one side of the spherical sphere mechanism 20 is provided with a shifting unit 50, and the hemispherical other side thereof is provided with a design unit 60.

When the sphere mechanism 20 is rotated with respect to the housing 10, a state where any one of the shifting unit 50 or the design unit 60 is exposed to the vehicle interior and the other one thereof is hidden is maintained.

The shifting unit 50 is provided with a shifting mechanism 70 operated by a driver for shifting, and as shown in FIG. 1, FIG. 2, FIG. 3, and FIG. 4, the shifting mechanism 70 may be formed of a shifting dial 71, and as an exemplary embodiment of the present disclosure, may be formed of any one of a shifting button or a shifting lever.

Here, when the shifting mechanism 70 is formed of the shifting dial 71 or formed of the shifting lever, a separate P-stage button 74 may be additionally provided together.

Any one of an R-stage, an N-stage, and a D-stage may be selected by operating the shifting dial 71, and the P-stage is operated by pressing the separate P-stage button 74.

The shifting button is operated by the driver selectively pressing any one of the P-stage button, the R-stage button, the N-stage button, and the D-stage button.

The shifting lever can select any one of the R-stage, the N-stage, and the D-stage through the rotation operation of the driver, and the P-stage is operated by pressing the separate P-stage button 74.

The exemplary embodiment of the present disclosure has a configuration that further includes a first printed circuit board (PCB) 90 configured to receive an operation signal of the shifting mechanism 70 to output a control signal to a transmission control unit (TCU) 80, and the first PCB 90 may be fixed to and provided on the sphere mechanism 20 to face the shifting mechanism 70.

When the operation signal of the shifting mechanism 70 is generated, the first PCB 90 delivers a signal to the transmission control unit 80, a transmission actuator is operated by a signal instructed by the transmission control unit 80, and a hydraulic pressure is applied or blocked to a hydraulic circuit for each shifting stage of a transmission by the operation of the transmission actuator and therefore, the shift control is electronically performed.

The design unit 60 includes a light source 100 coupled to the first PCB 90 and turned ON/OFF by the control of the first PCB 90, and a light window 110 on which a pattern 111 with a specific shape is formed on a surface thereof to implement indirect light when the light source 100 is turned on.

The light source 100 provided on the first PCB 90 is a light-emitting diode (LED) light source, and can implement the indirect light (mood light, ambient light), and in particular, can also implement a welcome function in response to the user's gesture.

The light window 110 may be formed of a hemispherical tempered glass, and formed of a transparent window or a translucent window through which the light of the light source 100 can transmit.

Furthermore, the design unit 60 has a configuration that further includes a diffusion member 120 configured to diffuse the light of the light source 100, and the diffusion member 120 is coupled to and provided on the light window 110 to face the light source 100, and may be formed of a prism, for example.

Figure 6:
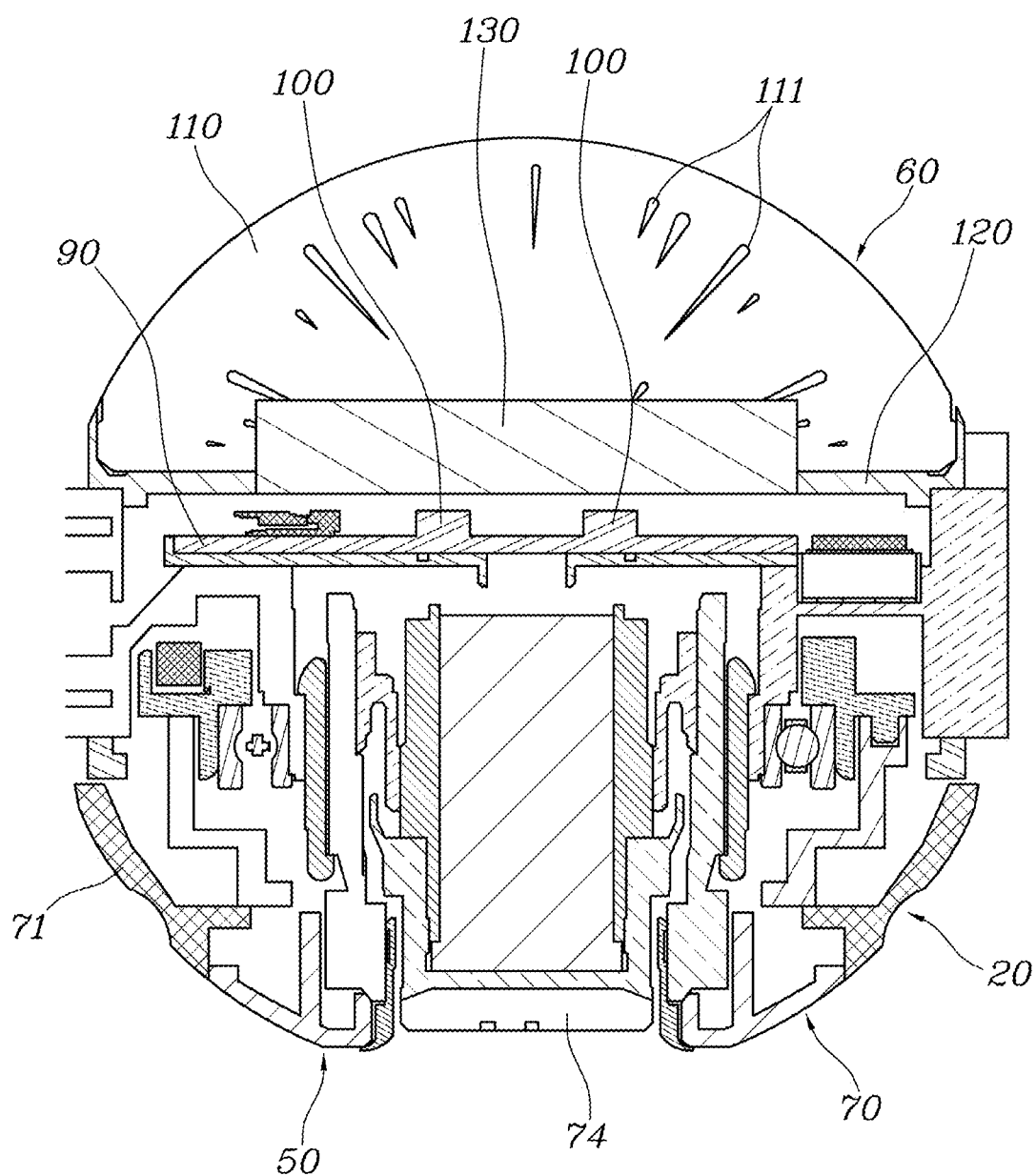

Furthermore, as shown in FIG. 6, the design unit 60 can further include a display device 130 configured to send a specific image through the light window 110.

It is possible to further increase visual visibility by sending the image set by the user through the display device 130.

The display device 130 may be fixed to and provided on the light window 110 or the diffusion member 120, and the operation of the display device 130 may be controlled by the first PCB 90.

The power mechanism 30 includes a motor 31 fixed to and provided on the housing 10, a plurality of gear members 32 connecting the motor 31 with the rotation shaft 40 to deliver the power of the motor 31 to the rotation shaft 40, and a second PCB 33 fixed to the housing 10 to control the operation of the motor 31.

The second PCB 33 controls the motor 31 to be driven when a signal of an input unit 140 is input, and the signal of the input unit 140 may be configured to use any one of start-ON and -OFF signals of a vehicle, or an open signal and a close signal of a door, or an unlock signal or a lock signal of the door, or a traveling mode change signal (autonomous traveling mode or manual driving mode change signal), or an ON signal and an OFF signal of an operation switch.

When the signal of the input unit 140 is input, the motor 31 is driven by the control of the second PCB 33, the power of the motor 31 is delivered to the rotation shaft 40 through the gear member 32 to allow the rotation shaft 40 to rotate with respect to the housing 10, and the sphere mechanism 20 is rotated with the rotation shaft 40.

Figure 5:
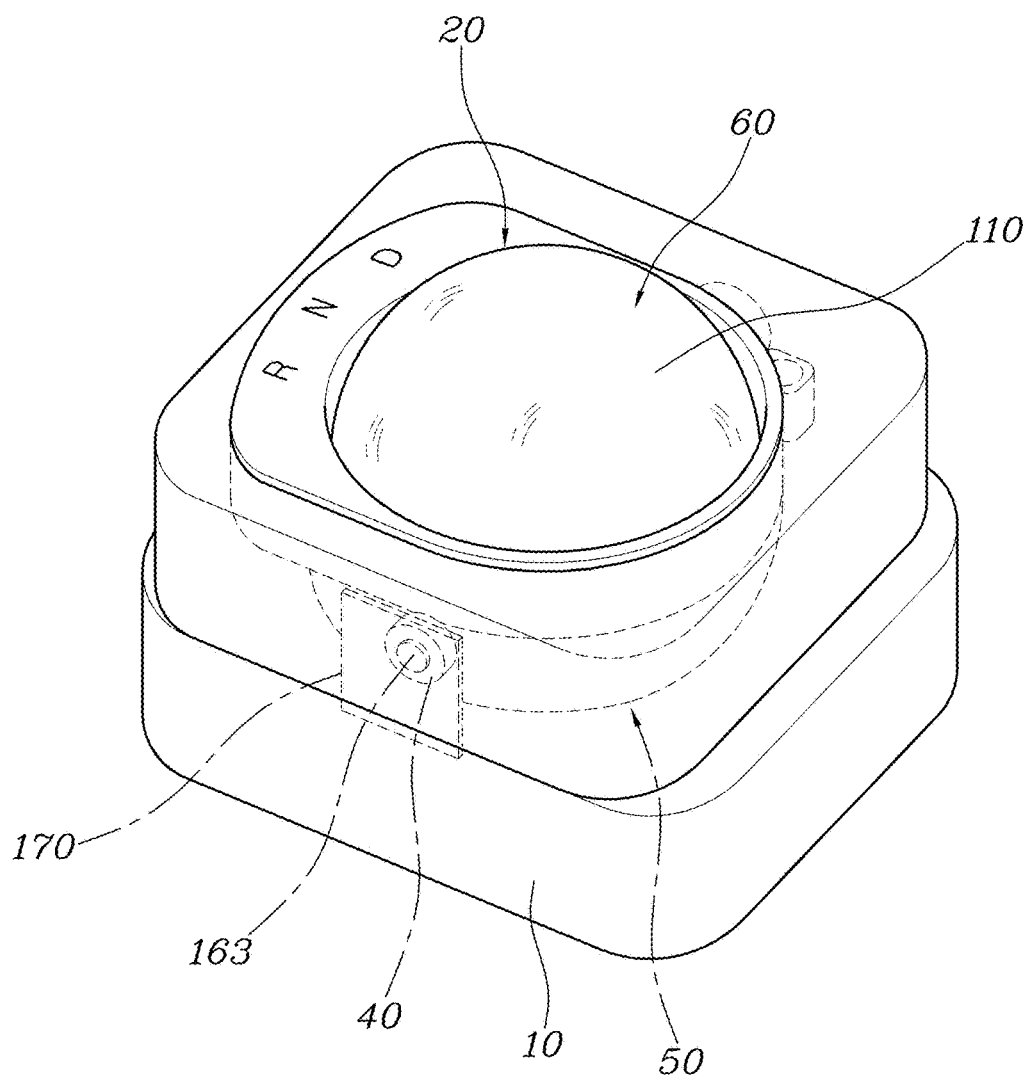
FIG. 5 and FIG. 6 are diagrams showing a state where a sphere mechanism is rotated so that a design unit is exposed.

The rotation shaft 40 of the sphere mechanism 20 is rotated by 180 degrees upon one-time operation of the power mechanism 30, and therefore, upon rotation of the sphere mechanism 20, as shown in FIG. 1, FIG. 2, FIG. 3, and FIG. 4, the shifting unit 50 is exposed to the vehicle interior through an opening portion of the housing 10, or as shown in FIG. 5 and FIG. 6, the design unit 60 is operated to be exposed to the vehicle interior through the opening portion of the housing 10.

Furthermore, a permanent magnet (magnet) 163 is coupled to the end portion of the rotation shaft 40 penetrating the sphere mechanism 20, and a third PCB 170 provided with a hall sensor 150 is fixed to and provided on the housing 10 to face the permanent magnet 163.

The hall sensor 150 can detect the rotation of the rotation shaft 40, a sensing signal of the third PCB 170 may be delivered to the second PCB 33, and the driving of the motor 31 may be controlled by the second PCB 33 more accurately.

When the permanent magnet 163 is rotated with the rotation shaft 40, the hall sensor 150 can detect a change in the intensity of a magnetic field according to a change in the rotation location of the permanent magnet 163, and at the instant time, the sensing signal of the third PCB 170 is delivered to the second PCB 33, and the motor 31 may be controlled to be driven and terminated by the control of the second PCB 33.

The sphere mechanism 20 according to the exemplary embodiment of the present disclosure is configured to receive the power of the motor 31 to be rotated with respect to the housing 10 or be rotated by the user's manual operation.

A state where the sphere mechanism 20 receives the power of the motor 31 to be rotated with respect to the housing 10, and the rotation of the sphere mechanism 20 is restricted to a holding torque of the motor 31 may be regarded as a general shift lock of an auto lever.

The shift lock is a safe device configured to enable the shifting lever to be shift-operated according to the user's will only when the user's will to operation is confirmed to prevent mal-operation, and generally includes the control unit (PCB) and the motor (solenoid).

Furthermore, when the shift lock is not released by use of the power of the due to failure of the control unit or the motor forming the shift lock, the user can manually, forcibly release the shift lock by use of a release lever, which may be referred to as shift lock release or override.

Therefore, even in case of the sphere type shifting apparatus according to an exemplary embodiment of the present disclosure, the sphere mechanism 20 should be rotated by only the user's manual operation to implement the function of the shift lock release.

Figure 7:
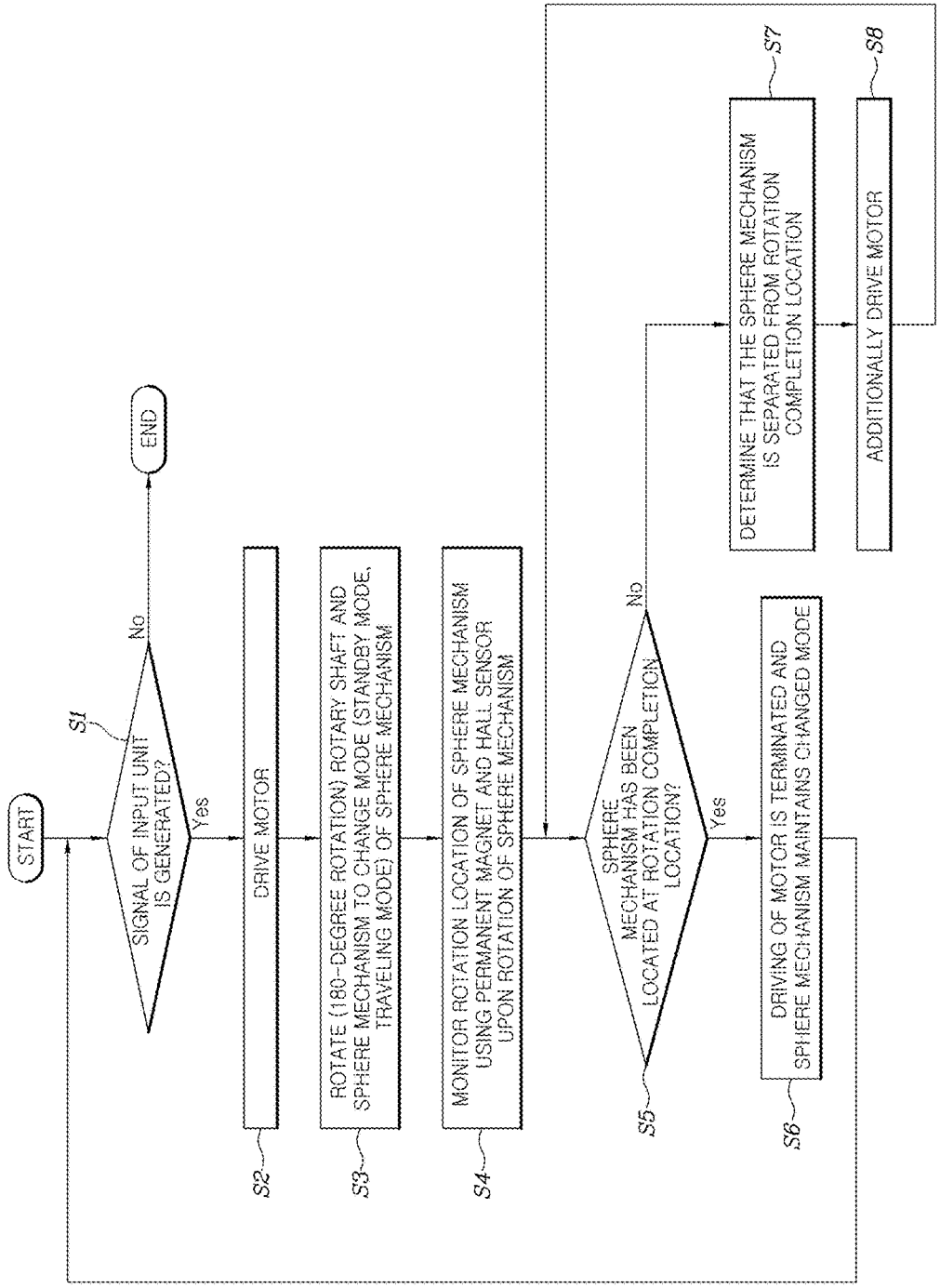
FIG. 7 is a flowchart for explaining a method for controlling an operation of a sphere type shifting apparatus according to various exemplary embodiments of the present disclosure.

FIG. 7 shows a flowchart for explaining the operation control method according to the various exemplary embodiments of the present disclosure.

The control method according to the various exemplary embodiments are a logic configured for preventing the sphere mechanism 20 from being separated from the rotation completion location thereof upon rotation operation of the sphere mechanism 20, and therefore, there are advantages in that it is possible to prevent occurrence of clearance of the sphere mechanism 20, prevent unnecessary noise due to the sphere mechanism 20, and improve luxuriousness.

In other words, when the sphere mechanism 20 which is a rotary body is rotated by the power of the motor 31, bounce can occur in a reverse direction opposite to a rotation direction of the sphere mechanism 20 by the rotation inertia of the sphere mechanism 20 or the elasticity of a stopping mechanism, and in the instant case, the sphere mechanism 20 cannot be accurately located at the rotation completion location.

Furthermore, even when an external force is applied to the sphere mechanism 20 in a reverse direction or the sphere mechanism 20 stops beyond the rotation completion location, the sphere mechanism 20 cannot be accurately located at the rotation completion location.

As described above, there occur problems in that if the sphere mechanism 20 is not accurately located at the rotation completion location when rotated by the power of the motor 31, clearance of the sphere mechanism 20 occurs, and unnecessary noise due to the sphere mechanism 20 is generated through the clearance, and furthermore, it is not possible to pursue the luxurious image.

The logic of the various exemplary embodiments of the present disclosure is a logic configured for preventing the sphere mechanism 20 from being separated from the rotation completion location upon rotation operation of the sphere mechanism 20, and therefore, it is possible to prevent occurrence of clearance of the sphere mechanism 20, prevent unnecessary noise due to the sphere mechanism 20, and improve luxuriousness.

FIG. 8A, FIG. 8B, and FIG. 8C show diagrams of a situation of the various exemplary embodiments of the present disclosure.

FIG. 8A shows a situation in which an external force (F1) is applied to the sphere mechanism 20 in a reverse direction when the sphere mechanism 20 is rotated by the power of the motor 31, and FIG. 8B shows a situation in which bounce occurs in the reverse direction opposite to the rotation direction of the sphere mechanism 20 by the reverse external force (F1) (arrow R1).

As shown in FIG. 8B, when the bounce of the sphere mechanism 20 occurs, a reference line (L1) of the rotation completion location and a center line (L2) of the sphere mechanism 20 do not match with each other.

FIG. 8C shows a state where the sphere mechanism 20 is rotated in a normal direction again by the additional driving of the motor 31 after the reverse bounce occurs and the sphere mechanism 20 is accurately located at the rotation completion location, and at the instant time, the reference line (L1) of the rotation completion location and the center line (L2) of the sphere mechanism 20 match with each other.

As shown in FIG. 7, the operation control method according to the various exemplary embodiments of the present disclosure includes a rotation step that rotates the sphere mechanism 20 by the power generated by the driving of the motor 31 when the signal of the input unit 140 configured to generate a rotation operation signal of the sphere mechanism is generated; a location determination step that determines whether the sphere mechanism 20 has been located at the rotation completion location by monitoring the rotation of the sphere mechanism 20; and a motor addition driving step that additionally drives the motor 31 whose driving is terminated so that the sphere mechanism 20 is located at the rotation completion location when it is determined that the sphere mechanism 20 is not located at the rotation completion location.

When the signal of the input unit 140 is generated based on the state where the vehicle can travel (step S1), the motor 31 is driven (step S2), and the rotation shaft 40 and the sphere mechanism 20 are rotated by the driving of the motor 31 together with respect to the housing 10 (step S3).

The motor 31 is a component in which driving is controlled by the PCB when the signal of the input unit 140 is generated, and the PCB configured to control the driving of the motor 31 becomes the second PCB 33.

The signal of the input unit 140 may be any one of start-ON and -OFF signals of a vehicle, or an open signal and a close signal of a door, or an unlock signal or a lock signal of the door, or a traveling mode change signal (autonomous traveling mode or manual driving mode change signal), or an ON signal and an OFF signal of a switch.

A mode of the sphere mechanism 20 includes a traveling mode popped-up so that the shifting unit 50 is exposed to the vehicle interior through the opening portion of the housing, and a standby mode popped-up so that the design unit 60 is exposed to the vehicle interior through the opening portion of the housing 10.

In case of the traveling mode state where the shifting unit 50 is exposed to the vehicle interior through the opening portion of the housing 10 by the rotation of the sphere mechanism 20, the design unit 60 becomes a hidden state of being inserted into the housing 10.

On the other hand, in case of the standby mode state where the design unit 60 is exposed to the vehicle interior through the opening portion of the housing 10 by the rotation of the sphere mechanism 20, the shifting unit 50 becomes a hidden state of being inserted into the housing 10.

The traveling mode and standby mode of the sphere mechanism 20 are alternately changed whenever the sphere mechanism 20 is rotated by 180 degrees.

The monitoring of the rotating sphere mechanism 20 and the detection of the rotation completion location of the sphere mechanism 20 may be made by the permanent magnet 163 coupled to the rotation shaft 40 rotated with the sphere mechanism 20 and the hall sensor 150 provided on the third PCB 170.

When the rotation shaft 40 is rotated by the operation of the motor 31 and the location of the permanent magnet 163 is changed by the rotation of the rotation shaft 40, the hall sensor 150 can detect a change in a magnetic field according to a change in the rotation location of the permanent magnet 163, and therefore, the third PCB 170 can use the signal of the hall sensor 150 to monitor the rotation location of the sphere mechanism 20 (step S4) and to determine the rotation completion location of the sphere mechanism 20 (step S5).

The sensing signal of the third PCB 170 is delivered to the second PCB 33.

The rotation completion location of the sphere mechanism 20 is a location when the sphere mechanism 20 is in a state of being rotated by 180 degrees.

Meanwhile, when the 180-degree rotation of the sphere mechanism 20 is completed and the motor 31 is stopped, it is confirmed whether the sphere mechanism 20 is located at the rotation completion location for a certain time (300 ms) from that time.

Therefore, because it is not confirmed whether the sphere mechanism 20 is located at the rotation completion location after the certain time (300 ms), it is possible to prevent misrecognition of additional vibration. In other words, a motor additional driving step (step S8) is not performed again after the motor additional driving step (step S8) to be described later.

In step S5, as a result of determining the rotation completion location of the sphere mechanism 20, if it is determined that the sphere mechanism 20 is located at the rotation completion location, the driving of the motor 31 is terminated by the control of the second PCB 33, and the sphere mechanism 20 maintains the changed mode until the signal of the input unit 140 is generated again (step S6).

However, in step S5, as a result of determining the rotation completion location of the sphere mechanism 20, if it is determined that the sphere mechanism 20 is not located at the rotation completion location, it is determined that the sphere mechanism 20 is separated from the rotation completion location (step S7), and at the instant time, the motor additional driving step that additionally drives the motor 31 whose driving is terminated so that the sphere mechanism 20 is located at the rotation completion location is performed (step S8), and therefore, the sphere mechanism 20 is accurately located at the rotation completion location and the movement thereof is fixed by the holding torque of the motor 31.

In step S8 (motor addition driving step), a direction in which the motor 31 rotates may be a normal direction (clockwise direction) or a reverse direction (counterclockwise direction).

Furthermore, in step S8 (motor addition driving step), when the motor 31 is additionally driven, an alarm of the addition driving of the motor 31 is generated and provided to passengers in the vehicle, and the passengers in the vehicle can recognize that an abnormal situation has occurred through the provided alarm, and the alarm may include one or more of an audible signal, a tactile signal, and a visual signal.

FIG. 9 shows a flowchart for explaining an operation control method of various exemplary embodiments of the present disclosure.

The control method according to the various exemplary embodiments has advantages in that it is possible to prevent damage to parts and strengthen stability by inducing the normal operation so that the sphere mechanism 20 reaches the rotation completion location through the fail-safe function when the sphere mechanism 20 does not reach the rotation completion location upon rotation operation of the sphere mechanism 20, and terminating the operation of the motor if the normal operation in which the sphere mechanism 20 reaches the rotation completion location is not available.

In other words, if the sphere mechanism 20 is stuck or foreign substances are stuck thereto when the sphere mechanism 20 is rotated by the power of the motor 31, there occurs a situation in which it is difficult for the sphere mechanism 20 to be rotated, and in the instant case, the sphere mechanism 20 cannot reach the rotation completion location.

As described above, if the sphere mechanism 20 does not reach the rotation completion location accurately when rotated by the power of the motor 31, there occurs problems in that stability and reliability for operation deteriorate, and furthermore, luxurious image cannot be pursued.

The logic according to the various exemplary embodiments of the present disclosure is a logic configured for inducing the normal operation so that the sphere mechanism 20 reaches the rotation completion location through the fail-safe function when the sphere mechanism 20 cannot reach the rotation completion location upon rotation operation of the sphere mechanism 20, and in particular, if the normal operation in which the sphere mechanism 20 reaches the rotation completion location is not available, the operation of the motor 31 can be terminated, preventing damage to parts and strengthening stability.

FIG. 10A, FIG. 10B, FIG. 10C, and FIG. 10D show diagrams of a situation of the various exemplary embodiments of the present disclosure.

FIG. 10A shows a situation when the sphere mechanism 20 starts to be rotated by the power of the motor 31, in which the sphere mechanism 20 is rotated by the power of the motor 31 in the clockwise direction (arrow R11) in a situation in which the reference line (L1) of the rotation completion location and the center line (L2) of the sphere mechanism 20 match with each other.

FIG. 10B shows a situation in which the sphere mechanism 20 cannot be rotated by an external force (F2) due to sticking of the sphere mechanism 20 rotated in the clockwise direction (arrow R11) or foreign substances stuck thereto, and at the instant time, the sphere mechanism 20 cannot reach the rotation completion location.

FIG. 10C shows a situation in which the normal operation is induced so that the sphere mechanism 20 reaches the rotation completion location through the fail-safe function if the sphere mechanism 20 cannot be rotated by the external force (F2) due to sticking thereof or foreign substance stuck thereto and cannot reach the rotation completion location, and at the instant time, the sphere mechanism 20 repeats the rotation in the counterclockwise direction (arrow R12) and the rotation in the clockwise direction (arrow R13) by the reference number of times (N times) with the power of the motor 31.

FIG. 10D shows a situation in which the sphere mechanism 20 does not reach the rotation completion location by the external force (F2) even after the sphere mechanism 20 repeats the rotation in the counterclockwise direction (arrow R12) and the rotation in the clockwise direction (arrow R13) by the reference number of times (N times) in the situation of FIG. 10C, and the present case is a situation in which the operation of the motor 31 is terminated to prevent damage to parts and strengthen stability.

As shown in FIG. 9, the operation control method according to the various exemplary embodiments of the present disclosure includes a rotation step that rotates the sphere mechanism 20 to change the mode of the sphere mechanism 20 by the power generated by the driving of the motor 31 when the signal of the input unit 140 configured to generate the rotation operation signal of the sphere mechanism 20 is generated; a location determination step that determines whether the sphere mechanism 20 has reached the rotation completion location within a predetermined time period by monitoring the rotation of the sphere mechanism 20; a determination times check step that checks the number of times of determination in the location determination step when it is determined that the sphere mechanism 20 does not reach the rotation completion location, and checks whether the number of times of determination has exceeded a reference number of times (N times); and a return step that drives the motor 31 in the reverse direction when it is determined that the number of times of determination does not exceed the reference number of times (N times), and returns the sphere mechanism 20 to an original state by the reverse driving of the motor 31.

When the signal of the input unit 140 is generated based on the state where the vehicle can travel (step S11), the motor 31 is driven (step S12), and the rotation shaft 40 and the sphere mechanism 20 are rotated by the driving of the motor 31 together with respect to the housing 10 (step S13).

The motor 31 is a component in which driving is controlled by the PCB when the signal of the input unit 140 is generated, and the PCB configured to control the driving of the motor 31 becomes the second PCB 33.

The signal of the input unit 140 may be any one of start-ON and -OFF signals of a vehicle, or an open signal and a close signal of a door, or an unlock signal or a lock signal of the door, or a traveling mode change signal (autonomous traveling mode or manual driving mode change signal), or an ON signal and an OFF signal of a switch.

A mode of the sphere mechanism 20 includes a traveling mode popped-up so that the shifting unit 50 is exposed to the vehicle interior through the opening portion of the housing, and a standby mode popped-up so that the design unit 60 is exposed to the vehicle interior through the opening portion of the housing 10.

In case of the traveling mode state where the shifting unit 50 is exposed to the vehicle interior through the opening portion of the housing 10 by the rotation of the sphere mechanism 20, the design unit 60 becomes a hidden state of being inserted into the housing 10.

On the other hand, in case of the standby mode state where the design unit 60 is exposed to the vehicle interior through the opening portion of the housing 10 by the rotation of the sphere mechanism 20, the shifting unit 50 becomes a hidden state of being inserted into the housing 10.

The traveling mode and standby mode of the sphere mechanism 20 are alternately changed whenever the sphere mechanism 20 is rotated by 180 degrees.

The monitoring of the rotating sphere mechanism 20 and the detection of the rotation completion location of the sphere mechanism 20 may be made by the permanent magnet 163 coupled to the rotation shaft 40 rotated with the sphere mechanism 20 and the hall sensor 150 provided on the third PCB 170.

When the rotation shaft 40 is rotated by the operation of the motor 31 and the location of the permanent magnet 163 is changed by the rotation of the rotation shaft 40, the hall sensor 150 can detect a change in a magnetic field according to a change in the rotation location of the permanent magnet 163, and therefore, the third PCB 170 can use the signal of the hall sensor 150 to monitor the rotation location of the sphere mechanism 20 (step S14) and to determine the rotation completion location of the sphere mechanism 20 (step S15).

The sensing signal of the third PCB 170 is delivered to the second PCB 33.

The rotation completion location of the sphere mechanism 20 is a location when the sphere mechanism 20 is in a state of being rotated by 180 degrees.

In step S15, it is determined whether the sphere mechanism 20 has reached the rotation completion location within 4 seconds from the time at which the sphere mechanism 20 is rotated when rotated by the power of the motor 31, and at the instant time, the time (4 seconds) may be tuned to an appropriate time.

In step S15, as a result of determining the rotation completion location of the sphere mechanism 20, if it is determined that the sphere mechanism 20 reaches the rotation completion location, the driving of the motor 31 is terminated by the control of the second PCB 33, and the sphere mechanism 20 maintains the changed mode until the signal of the input unit 140 is generated again (step S16).

However, in step S15, as a result of determining the rotation completion location of the sphere mechanism 20, if it is determined that the sphere mechanism 20 dose not reach the rotation completion location, the number of times of determination in step S15 (location determination step) is checked (step S17), and the determination times check step that checks whether the number of times of determination has exceeded a reference number of times (N times) is performed (step S18).

In step S18 (determination times check step), when it is determined that the number of times of determination does not exceed the reference number of times (N times), the motor 31 is driven in the reverse direction (step S19), and the return step that returns the rotation shaft 40 and the sphere mechanism 20 to the original states by the reverse driving of the motor 31 is performed (step S20).

In step S20 (return step), the reverse driving of the motor 31 is a direction opposite to the driving direction of the motor 31 in step S12, and therefore, returning of the sphere mechanism 20 to the original state in step S20 (return step) becomes a state of the sphere mechanism 20 in the previous step of step S11, that is, before the signal of the input unit 140 is generated.

In other words, when the state of the sphere mechanism 20 is in the standby mode state before step S11, that is, before the signal of the input unit 140 is generated, in step S20 (return step), the sphere mechanism 20 returns to the standby mode state (original state) by the reverse driving of the motor 31.

The logic after step S20 (return step) is fed back to before step S12 to continuously perform the logic of the present disclosure.

Meanwhile, in step S18 (determination times check step), when it is determined that the number of times of determination exceeds the reference number of times (N times), the driving of the motor 31 is terminated to prevent damage to portions (motor, gear member, etc.) (step S21), and the control logic of the present disclosure is terminated to maintain and repair the shifting apparatus (step S22).

Furthermore, in step S20 (return step), when the sphere mechanism 20 returns to the original state by the reverse driving of the motor 31 or the driving of the motor 31 is terminated as the number of times of determination exceeds the reference number of times (N times) (step S21), each alarm is generated and provided to passengers in the vehicle, the passengers in the vehicle can recognize the abnormal situation through the provided alarm, and the alarm may include one or more of an audible signal, a tactile signal, and a visual signal.

As described above, the operation control method of the sphere type shifting apparatus according to an exemplary embodiment of the present disclosure can prevent the sphere mechanism 20 from being separated from the rotation completion location upon rotation operation of the sphere mechanism 20 including the shifting unit 50 provided on the hemispherical one side thereof and the design unit 60 provided on the hemispherical other side thereof, preventing occurrence of clearance of the sphere mechanism 20, preventing unnecessary noise due to the sphere mechanism 20, and improving luxuriousness.

Furthermore, the operation control method according to an exemplary embodiment of the present disclosure can induce the normal operation so that the sphere mechanism 20 can reach the rotation completion location through the fail-safe function when the sphere mechanism 20 cannot reach the rotation completion location due to sticking thereof or foreign substances stuck thereto upon rotation operation of the sphere mechanism 20, and in particular, terminate the operation of the motor 31 when the normal operation in which the sphere mechanism 20 reaches the rotation completion location is not available, preventing damage to parts and strengthening stability.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method for controlling an operation of a spherical shifting apparatus, the method comprising:
  rotating a sphere mechanism to change a mode of the sphere mechanism by a power generated by driving of a motor when a signal of an input unit configured to generate a rotation operation signal of the sphere mechanism is generated;
  determining whether the sphere mechanism has reached a rotation completion location within a predetermined time period by monitoring the rotating of the sphere mechanism;
  checking a number of times of determination in the determining whether the sphere mechanism has reached the rotation completion location when it is determined that the sphere mechanism does not reach the rotation completion location, and checking whether the number of times of determination has exceeded a reference number of times; and
  driving the motor in a reverse direction when it is determined that the number of times of determination does not exceed the reference number of times, and returning the sphere mechanism to an original state thereof by a reverse driving of the motor;
  wherein the mode of the sphere mechanism includes a traveling mode so that a shifting unit is exposed to a vehicle interior through an opening portion of a housing of the spherical shifting apparatus, and a standby mode so that a design unit is exposed to the vehicle interior through the opening portion of the housing,
  wherein the traveling mode and the standby mode are alternately changed whenever the sphere mechanism is rotated in 180 degrees, and
  wherein the design unit includes a light source and a light window having a specific pattern formed on a surface of the light window to implement indirect light.

2. The method of claim 1,
  wherein the driving of the motor is controlled by a printed circuit board (PCB) when the signal of the input unit is generated, and
  wherein the signal of the input unit is any one of start-ON and -OFF signals of a vehicle, or an open signal and a close signal of a door, or an unlock signal or a lock signal of the door, or a traveling mode change signal, or an ON signal and an OFF signal of a switch.

3. The method of claim 1, wherein in the determining whether the sphere mechanism has reached the rotation completion location, the rotation completion location of the sphere mechanism is a location when the sphere mechanism is in a state of being rotated in 180 degrees, and the rotation completion location is detected by use of a permanent magnet and a hall sensor rotated with the sphere mechanism.

4. The method of claim 1, wherein as a result of the determining whether the sphere mechanism has reached the rotation completion location, when it is determined that the sphere mechanism reaches the rotation completion location, the driving of the motor is terminated, and the sphere mechanism maintains the changed mode until the signal of the input unit is generated again.

5. The method of claim 1, wherein in the returning, the reverse driving of the motor is a direction opposite to a driving direction of the motor in the rotating.

6. The method of claim 1, wherein in the returning, the returning of the sphere mechanism to the original state is a state of the sphere mechanism before the signal of the input unit in the rotating is generated.

7. The method of claim 1, wherein when it is determined that the number of times of determination exceeds the reference number of times, the driving of the motor is terminated and a control logic is terminated.

8. The method of claim 7, wherein in the returning, when the sphere mechanism returns the original state by the reverse driving of the motor or the driving of the motor is terminated as the number of times of determination exceeds the reference number of times, an alarm is generated and provided to passengers in a vehicle.

9. A spherical shifting apparatus, comprising:
a sphere mechanism;
a motor engaged to the sphere mechanism;
an input device configured to generate a rotation operation signal of the sphere mechanism; and
a controller electrically connected to the motor and the input device,
wherein the controller is configured for:
rotating the sphere mechanism to change a mode of the sphere mechanism by a power generated by driving of the motor when the controller receives a signal from the input device;
determining whether the sphere mechanism has reached a rotation completion location within a predetermined time period by monitoring the rotating of the sphere mechanism;
checking a number of times of determination in the determining whether the sphere mechanism has reached the rotation completion location when the controller concludes that the sphere mechanism does not reach the rotation completion location, and checking whether the number of times of determination has exceeded a reference number of times; and
driving the motor in a reverse direction when the controller concludes that the number of times of determination does not exceed the reference number of times, and returning the sphere mechanism to an original state thereof by a reverse driving of the motor;
wherein the mode of the sphere mechanism includes a traveling mode so that a shifting unit is exposed to a vehicle interior through an opening portion of a housing of the spherical shifting apparatus, and a standby mode so that a design unit is exposed to the vehicle interior through the opening portion of the housing,
wherein the traveling mode and the standby mode are alternately changed whenever the sphere mechanism is rotated in 180 degrees, and
wherein the design unit includes a light source and a light window having a specific pattern formed on a surface of the light window to implement indirect light.

10. The spherical shifting apparatus of claim 9, wherein in the determining whether the sphere mechanism has reached the rotation completion location, the rotation completion location of the sphere mechanism is a location when the sphere mechanism is in a state of being rotated in 180 degrees.

* * * * *